(12) United States Patent
Breitschaft et al.

(10) Patent No.: US 12,487,678 B2
(45) Date of Patent: *Dec. 2, 2025

(54) METHOD FOR PROVIDING AN ACTIVE HAPTIC FEEDBACK SIGNAL FOR AN OPERATING ELEMENT

(71) Applicant: Bayerische Motoren Werke Aktiengesellschaft, Munich (DE)

(72) Inventors: Stefan Breitschaft, Nabburg (DE); Thomas Hilger, Iffeldorf (DE); Christian Knoll, Munich (DE); Stephan Mueller, Munich (DE); Hannes Trapp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 139 days.

This patent is subject to a terminal disclaimer.

(21) Appl. No.: 18/499,321

(22) Filed: Nov. 1, 2023

(65) Prior Publication Data

US 2024/0184375 A1 Jun. 6, 2024

(30) Foreign Application Priority Data

Dec. 1, 2022 (DE) ...................... 10 2022 131 902.4

(51) Int. Cl.
*G08B 6/00* (2006.01)
*B60K 35/10* (2024.01)
(Continued)

(52) U.S. Cl.
CPC .............. *G06F 3/016* (2013.01); *B60K 35/10* (2024.01); *B60K 35/25* (2024.01)

(58) Field of Classification Search
CPC ......... G06F 3/016; B60K 35/10; B60K 35/25; B60K 35/00; B60Q 9/00; B62D 1/046
See application file for complete search history.

(56) References Cited

U.S. PATENT DOCUMENTS

| 11,983,322 B2* | 5/2024 | Sheikholeslami ...... G06F 3/016 |
| 12,208,682 B2* | 1/2025 | Lambricht .............. H04W 4/80 |

(Continued)

FOREIGN PATENT DOCUMENTS

| DE | 10 2014 018 637 B4 | 5/2018 |
| DE | 10 2017 127 231 A1 | 5/2019 |

(Continued)

OTHER PUBLICATIONS

German-language Search Report issued in German Application No. 10 2022 131 902.4 dated Jun. 14, 2023 with partial English translation (12 pages).

*Primary Examiner* — Toan N Pham
(74) *Attorney, Agent, or Firm* — Crowell & Moring LLP (57) ABSTRACT

Methods, systems, and apparatuses are provided for providing an active haptic feedback signal for an operating element upon actuation of the operating element. Whether the operating element is actuated is determined. Whether a function is assigned to the operating element, if actuation of the operating element has been determined, is determined. The active haptic feedback signal is output to the operating element only in those cases in which actuation of the operating element has been determined and that a function is assigned to the operating element has been determined.

9 Claims, 7 Drawing Sheets (51) Int. Cl.
   *G06F 3/01* (2006.01)
   *G08B 21/00* (2006.01)
   *B60K 35/25* (2024.01)

(56) References Cited

U.S. PATENT DOCUMENTS

| | | | |
|---|---|---|---|
| 2016/0195932 A1* | 7/2016 | Czelnik | G06F 3/04886 |
| | | | 715/702 |
| 2019/0152388 A1 | 5/2019 | Frey et al. | |
| 2023/0113215 A1* | 4/2023 | Bodenstein | G05G 5/03 |
| | | | 701/36 |
| 2023/0347963 A1* | 11/2023 | Loeppen | H01H 13/85 |

FOREIGN PATENT DOCUMENTS

| | | |
|---|---|---|
| DE | 10 2019 213 211 A1 | 3/2021 |
| EP | 2 794 332 B1 | 10/2014 |

* cited by examiner

METHOD FOR PROVIDING AN ACTIVE HAPTIC FEEDBACK SIGNAL FOR AN OPERATING ELEMENT

CROSS REFERENCE TO RELATED APPLICATION

This application claims priority under 35 U.S.C. § 119 from German Patent Application No. 10 2022 131 902.4, filed Dec. 1, 2022, the entire disclosure of which is herein expressly incorporated by reference.

BACKGROUND AND SUMMARY

The present subject matter relates to a method for providing an active haptic feedback signal for an operating element upon actuation of the operating element, to an active haptic operating unit for a motor vehicle, and to a motor vehicle. The present subject matter is therefore in the field of operating elements for motor vehicles.

Traditionally, operating elements are embodied as individually suspended and guided buttons. Operating feedback is purely mechanical and depends on the mechanical elements used, such as springs and silicone domes, etc. Pressing a button therefore always results in haptic operating feedback, even if the function assigned to the button is not usable, such as in the case of a functionless "telephone" button which may also be installed, under certain circumstances, in automobiles that are not equipped with a telephone connection for reasons of variant minimization. In addition, operating units with pressably suspended panels that house a plurality of buttons are known in the prior art. The position of the finger on the panel is evaluated in this case and the corresponding function, which is stored at the selected location, is triggered. In this case, too, operating feedback is purely mechanical and therefore independent of whether or not the function can be executed.

In addition, multifunction operating devices with active haptics are also known in the prior art and are described, for example, in DE 10 2017 127 231 A1.

Against the background of this prior art, the object of the present subject matter is to specify improved operating units and improved provision of haptic feedback for operating elements that are suitable for enriching the prior art. A specific configuration of the present subject matter can achieve the object of providing design scope for haptic feedback from operating elements.

The object is accordingly achieved by a method for providing an active haptic feedback signal for an operating element upon actuation of the operating element. The method comprises determining whether there is actuation of the operating element and determining whether a function is assigned to the operating element if actuation of the operating element has been determined. The method is distinguished by the fact that the method further comprises outputting the active haptic feedback signal to the operating element only in those cases in which actuation of the operating element has been determined and it has been determined that a function is assigned to the operating element.

"Active haptic" means that a haptic feedback signal is not or at least not exclusively provided by passive mechanical elements, such as return springs and/or silicone domes, but rather by an active actuator which can be controlled accordingly. In other words, in order to provide an active haptic feedback signal, it may be necessary to provide an actuator in the operating element and to suitably control the actuator.

For example, the actuator may comprise a piezoelectric actuator or be designed as such. Alternatively, or additionally, the actuator may have other common actuator types, such as solenoids and/or voice coils.

A haptic feedback signal is a haptically perceptible event that can be output to the user. In particular, a haptic feedback signal can be output when the operating element is actuated, on the basis of which signal successful actuation of the operating element can be identified. The haptic feedback signal may optionally comprise a vibration, a pulse, a vibration pattern and/or a deflection. The haptic feedback signal can optionally be accompanied by an acoustic signal, although this is not absolutely necessary.

Actuation of the operating element can constitute proper execution of a switching operation with the operating element. If the operating element is in the form of a pushbutton, actuation may involve pressing the pushbutton beyond a possible predetermined pressure point. If the operating element is in the form of a toggle switch, actuation can optionally involve a tilting movement beyond a possible predetermined threshold.

Determining actuation of the operating element may optionally include determining when the operating element is touched. This can be advantageous in particular for operating elements which have a touch operating surface for example. In this case, determining actuation of the operating element may optionally include determining a position at which the operating element has been touched. Depending on the position of the touch, an evaluation can then be made as to whether or not there is actuation of the operating element. Thus, for example, it is possible to determine whether the operating element has been touched at the intended point, whether a function is or was assigned to the operating element at the time of the touch, and whether a predetermined force threshold was exceeded during the touch in order to be regarded as actuation of the operating element.

The fact that a function can be assigned to the operating element means that the actuation of the operating element signals a user input with the request to execute a function associated with the operating element. It is also possible that no function is assigned to an operating element. Alternatively or additionally, a function can be assigned only temporarily to an operating element or different functions can be assigned at different times. The operating element and/or the operating unit may be optionally formed in a steering wheel of a motor vehicle.

Outputting the active haptic feedback signal means that an event is produced and can be perceived haptically by the user on the operating element. This may optionally include outputting control signals to an actuator of the operating element, such that the actuator causes a haptically perceptible movement of the operating element.

The present subject matter has the advantage of enabling the context-dependent provision of haptic feedback signals. Thus, outputting a haptic feedback signal can be limited to those cases in which the actuation of the operating element also results in the triggering of a function associated with the operating element. In cases where no function is assigned to the operating element, for example because a function is generally not provided for an operating element or because the function is temporarily unavailable, it is possible to refrain from outputting a haptic feedback signal upon actuation of the operating element. This in turn has the advantage that the output of a haptic feedback signal upon actuation of the operating element can be considered by the user as a reliable indication that the input command has been accepted and the function is executed. In the absence of a haptic feedback signal, the user may accordingly assume that actuation of the operating element does not result in execution of a function. Consequently, the present subject matter has the advantage that the blind operability of the operating element is improved, since the user receives reliable information about the acceptance or non-acceptance of the input command by means of the haptic feedback signal and thus does not have to look at any associated screen in order to carry out a visual check. Thus, the present subject matter avoids distraction of the user. In addition, so-called dead areas can be defined by refraining from outputting a haptic feedback signal, thus making it possible to prevent incorrect operation. Consequently, the present subject matter may increase safety when operating the motor vehicle and thus road traffic safety. This also allows a situation-dependent feedback signal to be output. For example, in different situations, for example depending on the driving state, different feedback signals can be output to the user for the same symbolism or user input.

In addition, the present subject matter has the advantage that it is possible to provide an operating unit having one or more operating elements with a monolithic and/or seamless design and to nevertheless provide a haptic feedback signal and to output it to the user via the operating element. This can increase degrees of freedom for the design of the operating unit.

Optionally, determining whether a function is assigned to the operating element further comprises determining a functional characteristic assigned to the operating element, wherein the active haptic feedback signal is output on the basis of the determined assigned functional characteristic. This can be done in particular if different functions can be assigned to the operating element at different times. This has the advantage that the user can optionally identify which function is performed with the actuation of the operating element using the haptic feedback signal without a visual check. For example, the functional characteristic can represent a type of function. Various types of functions may concern, for example, functions for driving, such as speed control and/or lane guidance, and functions for controlling media playback and/or functions for controlling communication connections, such as a telephone connection. This can increase safety when operating the motor vehicle, since the user can optionally use the haptic feedback signal to identify early and without a visual check whether a desired or undesired type of function has been actuated.

The operating element may be able to be actuated in a first switching position and in a second switching position. In this case, the method may further comprise determining whether the operating element is actuated in the first switching position or in the second switching position. The active haptic feedback signal can then be output in such a way that a first active haptic feedback signal is output when the operating element is actuated in the first switching position and a second active haptic feedback signal is output when the operating element is actuated in the second switching position. This has the advantage that a plurality of different functions can be selected by gradually actuating the operating element and an active haptic feedback signal in each case confirms to the user that the associated switching state has been reached. Alternatively, more than two different switching positions and optionally more than two different associated active haptic feedback signals can be provided.

The operating element can be actuated in the first switching position by virtue of a first switching threshold being exceeded and the operating element can be actuated in the second switching position by virtue of a second switching threshold being exceeded, wherein the second switching threshold can be exceeded during an actuating movement which can be in the same direction as and can be more pronounced than an actuating movement for exceeding the first switching threshold. This allows a plurality of functions to be assigned to a single operating element in a simple and intuitive way. The more pronounced nature of the actuating movement may consist in a greater actuating force or may comprise a greater actuating force. For example, in the case of an operating element in the form of a pushbutton, the first switching threshold can be reached by pressing with a first button press and the second switching threshold can be reached by pressing with a second button press which is greater than the first button press. This has the advantage that the user can easily distinguish between the first and second switching positions.

Determining actuation of the operating element may comprise one or more of the following operations:

(i) determining actuation of the operating element in the first switching position when the first switching threshold is exceeded after a first return threshold has been exceeded. In other words, in order to detect actuation of the operating element in the first switching position, it may first be necessary to exceed a first return threshold that is below it, so that the exceeding of the first switching threshold is identified as an actuation operation. This can be effected by virtue of the fact that the first return threshold and the first switching threshold are exceeded for the first time when the operating element is actuated, or the actuation of the operating element has been reduced or attenuated in the meantime, without completely interrupting the actuation, to such an extent that the actuation has fallen back below the first return threshold again.

(ii) Determining actuation of the operating element in the second switching position when the second switching threshold has been exceeded after a second return threshold has been exceeded. In other words, in order to detect actuation of the operating element in the second switching position, it may first be necessary to exceed a second return threshold that is below it, so that the exceeding of the first switching threshold is identified as an actuation operation. This can be effected by virtue of the fact that the second return threshold and the second switching threshold are exceeded for the first time when the operating element is actuated, or the actuation of the operating element has been reduced or attenuated in the meantime to such an extent that the actuation has fallen back below the second return threshold again without the actuation having been completely interrupted and without the actuation having fallen back below the first return threshold again.

The first return threshold may be below the second return threshold and the second return threshold may be below the first switching threshold. In this context, "below" means that less pronounced actuation must be carried out, or that a lower actuating force is needed to reach the respective threshold than to reach switching thresholds that are above this threshold.

The operating element may be able to be repeatedly switched between the first switching position and the second switching position by repeatedly exceeding the second switching threshold and repeatedly falling below the second return threshold, without completely suspending actuation of the operating element. This has the advantage of switching between the first and second switching states or "toggling". This makes it possible to repeatedly actuate the operating element in an intuitive and simple manner in the various switching states without interrupting actuation. For example, the first switching position can be used to scroll in a list and the second switching position can be used to click on or activate the element in the list selected when the operating element is actuated in the second switching position.

The first active haptic feedback signal and the second active haptic feedback signal can optionally differ from each other. This has the advantage that the user receives information about which switching position of the operating element has been actuated and possibly which function is executed with it based on the haptic feedback and without a visual check.

The method can be computer-implemented, i.e. one, a plurality of or all steps of the method can be carried out at least partially by a computer or a data processing apparatus.

In addition, an active haptic operating unit for a motor vehicle is provided, which operating unit comprises at least one active haptic operating element and a control apparatus for controlling the at least one active haptic operating element. The active haptic operating unit is distinguished by the fact that the active haptic operating unit is configured to carry out a method described above. The above present subject matter concerning a method for providing an active haptic feedback signal for an operating element upon actuation of the operating element can also be regarded as disclosed for the active haptic operating unit for a motor vehicle and vice versa.

Furthermore, a motor vehicle is provided, which motor vehicle is distinguished by the fact that the motor vehicle comprises at least one active haptic operating unit explained above. The above present subject matter concerning a method for providing an active haptic feedback signal for an operating element upon actuation of the operating element can also be regarded as disclosed for a motor vehicle and vice versa.

The motor vehicle may be a passenger vehicle, in particular an automobile, or a commercial vehicle, such as a truck. The motor vehicle may be designed to undertake longitudinal guidance and/or lateral guidance, at least partially and/or at least temporarily, during automated driving of the motor vehicle. Automated driving can be carried out in such a way that the motor vehicle's movement is (largely) autonomous. Automated driving can be controlled at least partially and/or temporarily by the data processing apparatus.

It is understood that the features and examples mentioned above and explained below should not only be considered disclosed in the combinations explicitly mentioned in each case, but that other technically meaningful combinations and examples are also included in the disclosure content.

Optional examples are described below with reference to the figures.

Other objects, advantages and novel features of the present invention will become apparent from the following detailed description of one or more preferred examples when considered in conjunction with the accompanying drawings.

DETAILED DESCRIPTION OF THE DRAWINGS

The same reference signs are used for the same or similar elements in the figures. In the descriptions of the figures, reference signs are sometimes stated, even though the respective element may only be able to be seen in other figures.

Figure 1:
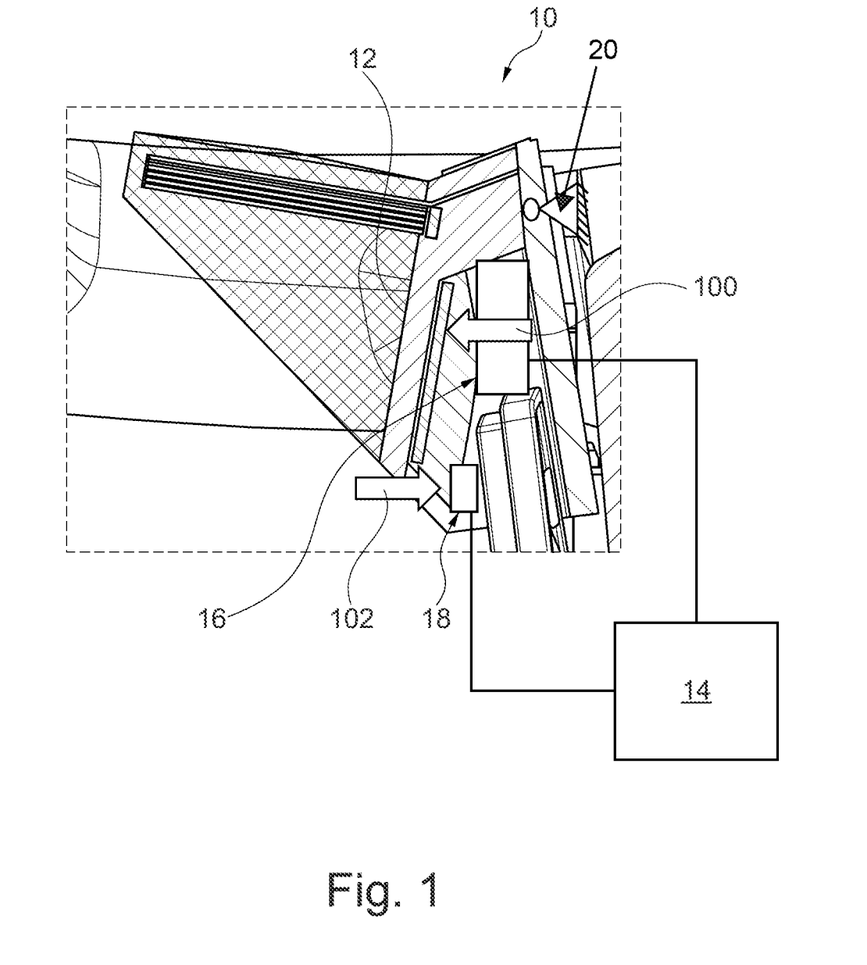
FIG. 1 shows a schematic illustration of an active haptic operating unit according to an optional example for a motor vehicle.

FIG. 1 shows a schematic illustration of an active haptic operating unit 10 according to an optional example for a motor vehicle. The active haptic operating unit 10 comprises at least one active haptic operating element 12 and a control apparatus 14 for controlling the at least one active haptic operating element 12. The active haptic operating unit 10 may comprise an actuator 16 and a force sensor 18. The actuator 16 may optionally be in the form of or comprise a voice coil actuator and may be designed to act mechanically on the operating element 12 in order to generate an active haptic feedback signal. Arrow 100 shows, by way of example, an effective direction of the actuator 16. The force sensor 18 may optionally be in the form of or comprise a piezoresistive force sensor and may be designed to detect a user input on the operating element 12, which is carried out, for example, by a button press, and to generate corresponding sensor signals. Arrow 102 shows, by way of example, a direction of the acting force during a user input. Optionally, both the actuator 16 and the force sensor 18 are connected to the control apparatus 14, with the result that the control apparatus 14 can receive the sensor signals from the force sensor 18 and can control and/or regulate the actuator 16 for the purpose of generating an active haptic signal. The arrow 20 indicates the bearing position of the operating element 12. According to other examples, the operating element 12 may be configured in a different manner and allow different actuation. In particular, according to optional examples, an effective direction of the actuator can be effected in a plurality of directions, for example in two spatial directions or in three spatial directions, including the direction in a plane of an operating surface of the operating element 12.

The active haptic operating unit 10 according to the optional example is distinguished by the fact that the active haptic operating unit 10 is configured to carry out a method explained below.

Figure 2:
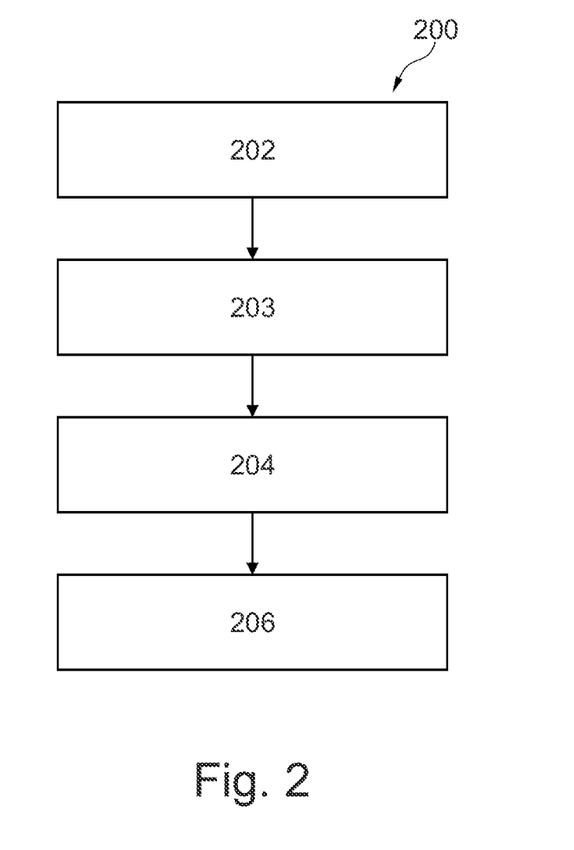
FIG. 2 shows a method for providing an active haptic feedback signal according to an optional example.

A method 200 for providing an active haptic feedback signal for an operating element 12 upon actuation of the operating element 12 is explained with reference to FIG. 2.

In a step 202, the method 200 comprises determining whether there is actuation of the operating element 12.

In a step 204, the method comprises determining whether a function is assigned to the operating element 12 if actuation of the operating element 12 has been determined.

In addition, in a step 206, the method comprises outputting the active haptic feedback signal to the operating element 12 only in those cases in which actuation of the operating element 12 has been determined and it has been determined that a function is assigned to the operating element 12.

Determining 204 whether a function is assigned to the operating element 12 may further comprise determining a functional characteristic assigned to the operating element, wherein the active haptic feedback signal can then be output 206 on the basis of the determined assigned functional characteristic.

Figure 3A:
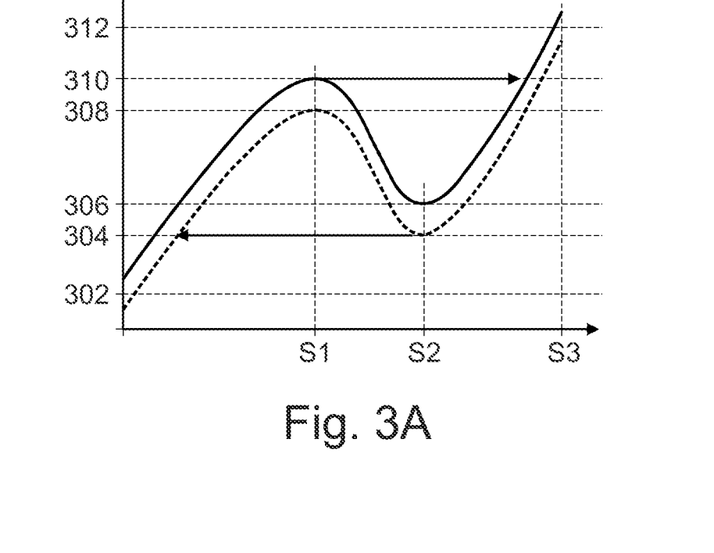
FIGS. 3A and 3B show a comparison of the restoring force (vertical axis) against the stroke (horizontal axis) for a conventional mechanical button with passive haptics (FIG. 3A) and an active haptic operating element according to an optional example (FIG. 3B)
Figure 3B:
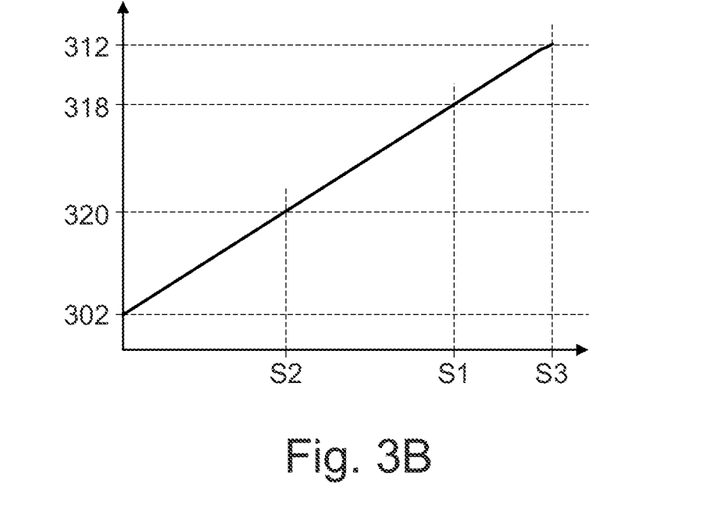

For the explanation of the technological background, FIGS. 3A and 3B show a comparison of the restoring force (vertical axis) against the stroke (horizontal axis) for a conventional mechanical button with passive haptics (FIG. 3A) and an active haptic operating element 12 according to an optional example. In the case of the conventional mechanical button, the horizontal guide lines drawn indicate a pretensioning force 302, a return threshold 304, a snap 306, a return snap 308, a switching threshold 310 and a stop 312. The threshold values S1, S2 and S3 indicate that the switching threshold 310, the snap 306 and the stop 312 have been reached. A snap can include latching or a latching movement. When the conventional button with passive haptics is actuated, the finger "falls" into the switching point (indicated by arrow 314) when the switching threshold 310 is crossed. When the button is released, the finger is pushed back, as indicated by arrow 316. This provides haptic feedback in a passive manner when the button is pressed and released.

In contrast to the conventional mechanical button, the restoring force (vertical axis) in the case of an active haptic operating element 12 can optionally be linear with the stroke (horizontal axis), as shown in FIG. 3B, for example. In this case, to facilitate orientation, the guide lines for the pretensioning force 302 and the stop 312 are drawn, as well as a switching threshold for an active haptic feedback signal 318 and a return threshold 320 for providing an optional active haptic signal for indicating the return threshold 320. Due to the linear progression, it is possible to achieve the situation in which the force required for actuating the operating element 12 can be perceived as being linear elastic.

Figure 4A:
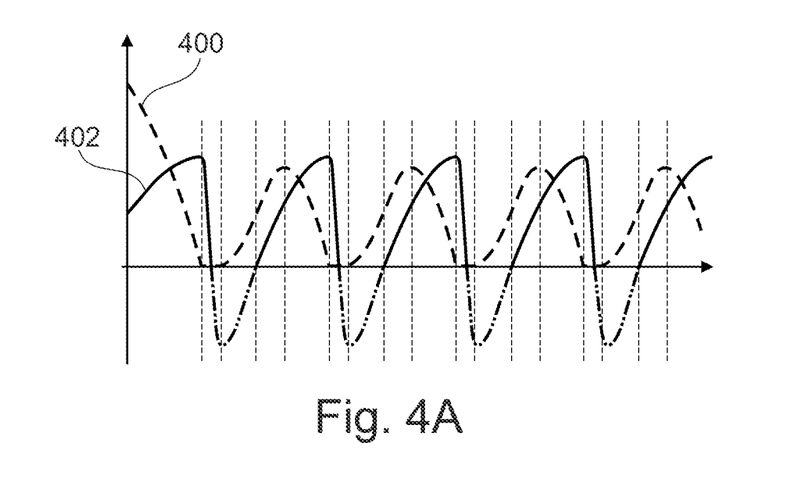
FIGS. 4A and 4B show, by way of example, a comparison for the temporal progression of the finger path and the finger force when a conventional mechanical button (FIG. 4A) and an active haptic operating unit according to an optional example (FIG. 4B) are actuated repeatedly.
Figure 4B:
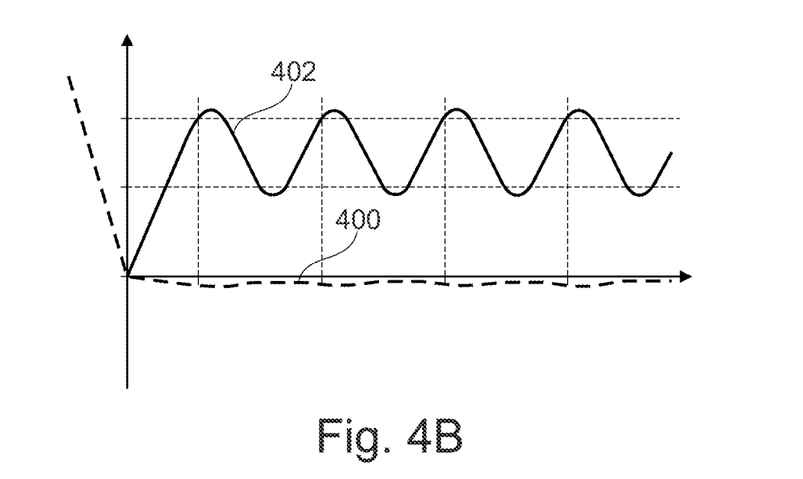

FIGS. 4A and 4B show, by way of example, a comparison for the temporal progression of the finger path 400 and the finger force 402 when a conventional mechanical button (FIG. 4A) and an active haptic operating unit 12 according to an optional example (FIG. 4B) are actuated repeatedly. The guide lines indicate switching thresholds, return thresholds and switching operations. It can be seen that, by means of an active haptic operating element 12, the active haptic operating element 12 can be repeatedly actuated with a significantly shorter finger path or lower finger stroke than in the case of a conventional mechanical button.

Optionally, the operating element 12 can be actuated in a first switching position 31 and in a second switching position 32. In this case, the method 200 may further comprise, in a step 203, determining whether the operating element 12 is actuated in the first switching position 31 or in the second switching position 32. The active haptic feedback signal can then be output 206 in such a way that a first active haptic feedback signal is output when the operating element 12 is actuated in the first switching position 31 and a second active haptic feedback signal is output when the operating element 12 is actuated in the second switching position 32.

The operating element 12 can be actuated in the first switching position 31 by virtue of a first switching threshold 318a being exceeded and the operating element can be actuated in the second switching position 32 by virtue of a second switching threshold 318b being exceeded, wherein the second switching threshold 318b is exceeded during an actuating movement which is in the same direction as and is more pronounced than an actuating movement for exceeding the first switching threshold 318a. The more pronounced nature of the actuating movement may consist in a greater actuating force or may comprise a greater actuating force.

Determining 202, 203 actuation of the operating element 12 may comprise determining actuation of the operating element 12 in the first switching position 318a when the first switching threshold 31 is exceeded after a first return threshold 320a has been exceeded. In addition, this may comprise determining actuation of the operating element 12 in the second switching position 32 when the second switching threshold 318b has been exceeded after a second return threshold 320b has been exceeded. The first return threshold 320a may be below the second return threshold 320b and the second return threshold 320b may be below the first switching threshold 318a.

Figure 5A:
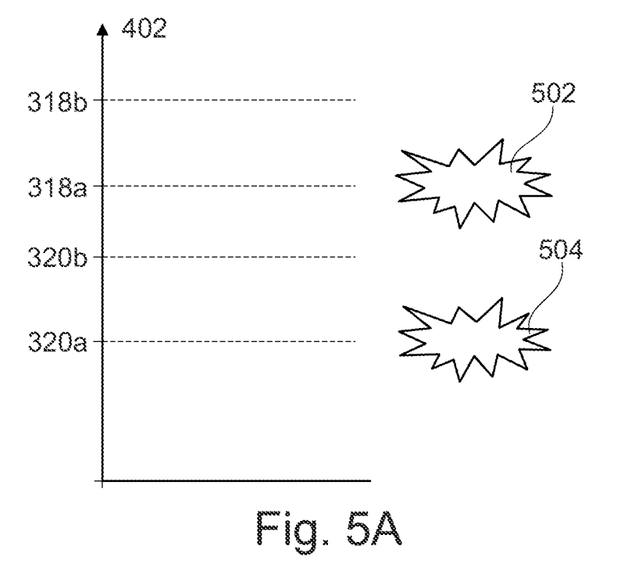
FIG. 5A schematically shows the relative arrangement of the first and second switching thresholds and the first and second return thresholds in a diagram showing the finger force on the vertical axis.
Figure 5B:
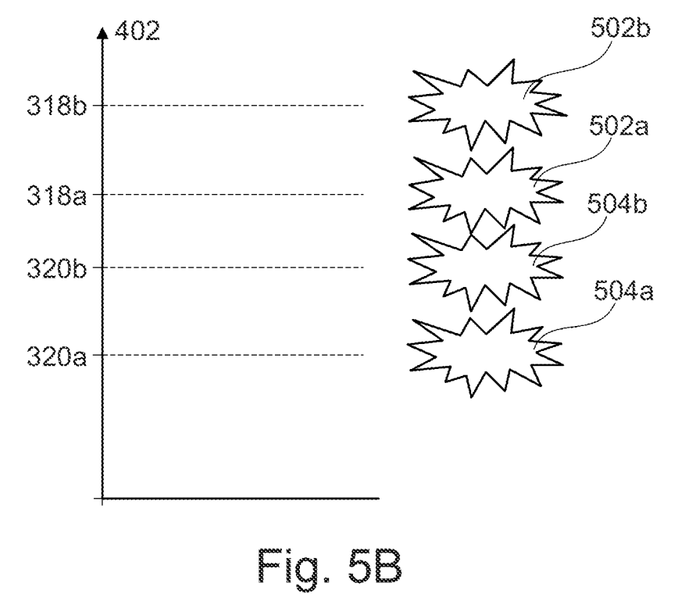
FIG. 5B shows a case in which the first switching position and the second switching position of the active haptic operating element are distinguished by separate active haptic feedback signals.

FIG. 5A schematically shows the relative arrangement of the first and second switching thresholds 318a, 318b and the first and second return thresholds 320a and 320b in a diagram showing the finger force 402 on the vertical axis. The output of an active haptic feedback signal 502 when the first switching threshold 318a is exceeded and the output of an optional return signal 504 when the return threshold 320a is fallen below are indicated on the right in FIG. 5A. FIG. 5B shows a case in which the first switching position 31 and the second switching position 32 of the active haptic operating element 12 are distinguished by separate active haptic feedback signals. In this case, a first active haptic feedback signal 502a is output when the first switching threshold 318a is exceeded, a first return signal 504a is output when the first return threshold 320a is fallen below, a second active haptic feedback signal 502b is output when the second switching threshold 318b is exceeded, and a second return signal 504b is output when the second return threshold 320b is fallen below. The first active haptic feedback signal 502a and the second active haptic feedback signal 502b can differ from each other. Optionally, the first return signal 504a and the second return signal 504b can also differ from each other.

Figure 6:
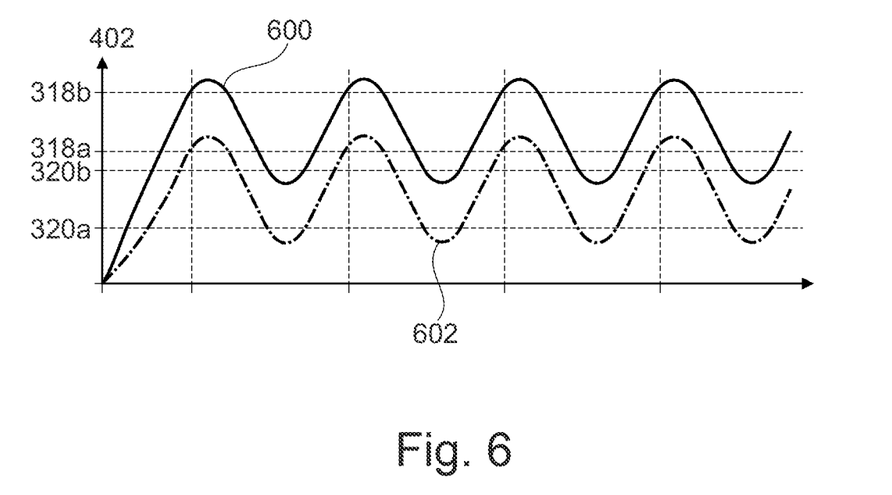
FIG. 6 shows a progression of the finger force for repeatedly actuating the operating element.

Optionally, the active haptic operating element 12 can be repeatedly switched between the first switching position 31 and the second switching position 32, without completely suspending actuation of the operating element 12, by repeatedly exceeding the second switching threshold 318b and repeatedly falling below the second return threshold 320b. In particular, this can be effected by not falling below the first return threshold 320a. This is illustrated by way of example in FIG. 6 with the graph 600, wherein the graph represents the finger force (vertical axis) relative to the time (horizontal axis). The vertical guide lines indicate the individual switching operations. Graph 602 shows a case in which the operating element 12 is repeatedly brought into the first switching position 31, without the operating element 12 in the meantime being actuated in the second switching position 32. This therefore makes it possible to operate the operating element 12 in a simple and intuitive manner with a plurality of different switching positions, without the need for a significant finger path. Rather, the operating element 12 can be frequently and selectively actuated by means of a targeted variation of the finger force or the pressure on the operating element 12.

Figure 7:
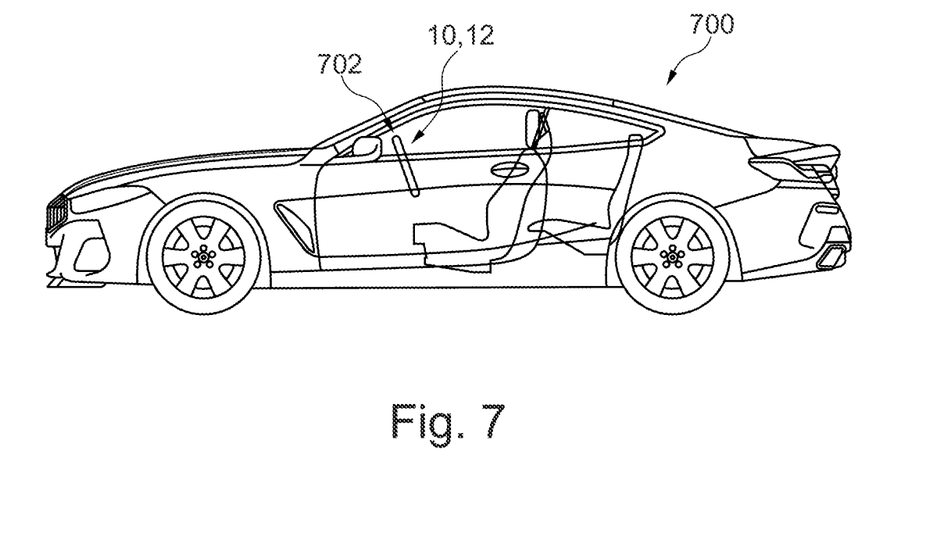
FIG. 7 shows, by way example, a motor vehicle according to an optional example.

FIG. 7 shows, by way of example, a motor vehicle 700 having a steering wheel 702, wherein the steering wheel 702 has an operating unit 10 according to the present subject matter with at least one operating element 12.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

The foregoing disclosure has been set forth merely to illustrate the invention and is not intended to be limiting. Since modifications of the disclosed examples incorporating the spirit and substance of the invention may occur to persons skilled in the art, the invention should be construed to include everything within the scope of the appended claims and equivalents thereof.

LIST OF REFERENCE SIGNS

10 Operating unit
12 Active haptic operating element
14 Control apparatus
16 Actuator
18 Force sensor
20 Bearing position
31 First switching position
32 Second switching position
100 Effective direction of the actuator
102 Force direction of the user input
200 Method for providing an active haptic feedback signal for an operating element
202-206 Method steps
302 Pretensioning force
304 Return threshold
306 Snap
308 Return snap
310 Switching threshold
312 Stop
314 Falling into the switching point
316 Pushing back the finger
318 Switching threshold for active haptic feedback signal
318a First switching threshold
318b Second switching threshold
320 Return threshold
320a First return threshold
320b Second return threshold
400 Finger path
402 Finger force
502 Active haptic feedback signal
502a First active haptic feedback signal
502b Second active haptic feedback signal
504 Return signal
504a First return signal
504b Second return signal
600, 602 Graphs
700 Motor vehicle
702 Steering wheel

What is claimed is:

1. A method for providing an active haptic feedback signal for an operating element upon actuation of the operating element, wherein the operating element can be actuated in a first switching position and in a second switching position, the method comprising:
 determining whether there is actuation of the operating element;
 determining whether a function is assigned to the operating element if actuation of the operating element has been determined;
 outputting the active haptic feedback signal to the operating element only in those cases in which actuation of the operating element has been determined and that a function is assigned to the operating element has been determined; and
 determining whether the operating element is actuated in the first switching position or in the second switching position, wherein
 the active haptic feedback signal is output such that a first active haptic feedback signal is output when the operating element is actuated in the first switching position, and
 a second active haptic feedback signal is output when the operating element is actuated in the second switching position.

2. The method according to claim 1, wherein the determining whether a function is assigned to the operating element further comprises:
 determining a functional characteristic assigned to the operating element, wherein
 the active haptic feedback signal is output based on the determined assigned functional characteristic.

3. The method according to claim 1, wherein
 the operating element is actuated in the first switching position via a first switching threshold being exceeded, and
 the operating element is actuated in the second switching position by virtue of a second switching threshold being exceeded, wherein
 the second switching threshold is exceeded during an actuating movement which is in the same direction as and is more pronounced than an actuating movement for exceeding the first switching threshold.

4. The method according to claim 3, wherein
 the more pronounced nature of the actuating movement consists in a greater actuating force or comprises a greater actuating force.

5. The method according to claim 1, wherein
 the determining actuation of the operating element comprises:

determining actuation of the operating element in the first switching position when the first switching threshold is exceeded after a first return threshold has been exceeded; and determining actuation of the operating element in the second switching position when the second switching threshold has been exceeded after a second return threshold has been exceeded, wherein the first return threshold is below the second return threshold and the second return threshold is below the first switching threshold.

6. The method according to claim 5, wherein the operating element can be repeatedly switched between the first switching position and the second switching position by repeatedly exceeding the second switching threshold and repeatedly falling below the second return threshold without completely suspending actuation of the operating element.

7. The method according to claim 1, wherein the first active haptic feedback signal and the second active haptic feedback signal differ from each other.

8. An active haptic operating unit for a motor vehicle, comprising:

at least one active haptic operating element; and a control apparatus for controlling the at least one active haptic operating element, wherein the active haptic operating unit is configured to carry out a method according to claim 1.

9. A motor vehicle, wherein the motor vehicle comprises at least one active haptic operating unit according to claim 8.

* * * * *